United States Patent [19]

Dupuy

[11] Patent Number: 5,687,199

[45] Date of Patent: Nov. 11, 1997

[54] SUBSTITUTION OF SYNCHRONIZATION BITS IN A TRANSMISSION FRAME

[75] Inventor: Pierre Dupuy, Paris, France

[73] Assignee: Alcatel Mobile Communication France, Paris, France

[21] Appl. No.: 300,204

[22] Filed: Sep. 2, 1994

[30] Foreign Application Priority Data

Sep. 6, 1993 [FR] France ................................ 93 10568

[51] Int. Cl.⁶ ........................................................ H04L 7/00
[52] U.S. Cl. ............................ 375/354; 375/368; 370/509
[58] Field of Search ................................. 375/354, 363, 375/365, 368; 370/105.1, 105.4, 105.5, 110.4, 111, 503, 506, 509, 514, 520

[56] References Cited

U.S. PATENT DOCUMENTS

| 3,261,921 | 7/1966 | Hakim et al. |
| 4,633,464 | 12/1986 | Anderson ................................. 370/111 |
| 4,813,040 | 3/1989 | Futato ..................................... 370/111 |
| 5,440,542 | 8/1995 | Procter et al. .......................... 370/111 |

FOREIGN PATENT DOCUMENTS

| 0100820A3 | 3/1985 | European Pat. Off. . |
| 4133031A1 | 4/1992 | Germany . |

OTHER PUBLICATIONS

JP-A-20 043 837 dated Feb. 14, 1990, *Patent Abstracts of Japan*, vol. 14, No. 200, apr. 24, 1990.

JP-A-10 091 539 dated Apr. 11, 1990, *Patent Abstracts of Japan*, vol. 13, No. 325, Jul. 21, 1989.

*Primary Examiner*—Stephen Chin
*Assistant Examiner*—Don Vo
*Attorney, Agent, or Firm*—Sughrue,Mion,Zinn,Macpeak & Seas, PLLC

[57] ABSTRACT

A transmission frame comprises a synchronization flag, synchronization bits and data bits. A control bit is substituted for one of the synchronization bits if any sequence of bits the same length as the synchronization flag including the synchronization bits differs from the synchronization flag by at least one bit in addition to the synchronization bit.

6 Claims, 6 Drawing Sheets

FIG. 1

| 0 | 0 | 0 | 0 | 0 | 0 | 0 | 0 |
|---|---|---|---|---|---|---|---|
| 1 | B1 | B2 | B3 | B4 | B5 | B6 | B7 |
| S1 | B8 | B9 | B10 | B11 | B12 | B13 | B14 |
| S2 | B15 | B16 | B17 | B18 | B19 | B20 | B21 |
| S3 | B22 | B23 | B24 | B25 | B26 | B27 | B28 |
| S4 | B29 | B30 | B31 | B32 | B33 | B34 | B35 |
| S5 | B36 | B37 | B38 | B39 | B40 | B41 | B42 |
| S6 | B43 | B44 | B45 | B46 | B47 | B48 | B49 |
| S7 | B50 | B51 | B52 | B53 | B54 | B55 | B56 |
| S8 | B57 | B58 | B59 | B60 | B61 | B62 | B63 |

PRIOR ART

SUBSTITUTION OF SYNCHRONIZATION BITS IN A TRANSMISSION FRAME

BACKGROUND OF THE INVENTION

Description of the Prior Art

In a system of synchronous communication between data processing equipments one of the most widely used methods for sending messages consists in defining a frame structure characterized by:

a synchronization flag, special coding of the data to be transmitted so that the synchronization flag cannot be recognized in the middle of the data stream transmitted.

One of the best known ways to implement this method is to choose a flag which is a constant stream of P binary zeros followed by a binary 1. The data is then coded simply by inserting a binary 1 each time that a series of (P−1) binary 0 has been transmitted. For example, if the flag is '00001', the message '0010 0000 10' is transmitted in the form: ' 00001 0010 00100 10'. The six underlined digits represent the synchronization flag and the inserted binary 1 (the spaces are included only to facilitate reading).

This method has a drawback: the time to transmit a message depends on its contents, which is a serious problem if a fixed routing time is required.

The known solution to this problem is to insert a binary 1 every (P−1) data bits transmitted: it is then certain that P consecutive binary zeros will never be encountered and the transmission time is always the same, regardless of the data transmitted. A well-known example of this method is the use of V.110 frames as defined by the CCITT (Comité Consultatif International du Téléphone et du Télégraphe). These frames comprise a flag made up of eight binary zeros followed by a binary 1, a binary 1 being then inserted every seven bits to form a frame of 80 bits, 17 bits used for synchronization and 63 bits for the data.

This type of frame therefore has the advantage of a fixed format. However, the bits forced to binary 1 which repeat periodically every P bits after the synchronization flag and referred to hereinafter as synchronization bits are not usually all needed.

It follows that transmission is not optimized in that unwanted bits are transmitted.

An object of the present invention is therefore a fixed format transmission frame with improved transmission efficiency.

SUMMARY OF THE INVENTION

In one aspect the present invention consists in a transmission frame comprising a synchronization flag, synchronization bits and data bits wherein a control bit is substituted for one of said synchronization bits if any sequence of bits the same length as the synchronization flag including said synchronization bits differs from said synchronization flag by at least one bit in addition to said synchronization bit.

In another aspect the invention consists in a transmitter for transmitting a transmission frame comprising a synchronization flag, synchronization bits and data bits, comprising analysis means for identifying one of said synchronization bits at least such that any sequence of bits having a length equal to that of said synchronization flag including said synchronization bits differs from said synchronization flag by at least one bit in addition to said synchronization bit and means for substituting a control bit for the synchronization bits so identified.

In a first embodiment of the transmitter, a control bit being associated with each synchronization bit, the transmitter transmits only the control bits which correspond to synchronization bits identified by the analysis means.

The control bits are advantageously successive bits of a code with good autocorrelation properties.

In a second embodiment of the transmitter, the control bits being classified in order of priority, the transmitter comprises distribution means for assigning control bits according to their rank to synchronization bits identified by the analysis means in the order of identification.

In a further aspect the present invention consists in a receiver for receiving a transmission frame transmitted by a transmitter as defined hereinabove, the receiver further comprising analysis means to determine the theoretical value of said synchronization bits and recovery means to identify at least that of said synchronization bits for which said control bit has been substituted.

The invention will emerge in more detail from the following description of embodiments of the invention given by way of example only and with reference to the appended drawings.

BRIEF DESCRIPTION OF THE DRAWINGS

FIG. 1 shows a typical prior art frame.

DETAILED DESCRIPTION OF THE PREFERRED EMBODIMENTS

The invention will be described with reference to the V.110 frame already cited as the latter has the merit of being universally known.

This frame shown in FIG. 1 in the form of a table is thus a sequence formed of a synchronization flag comprising a binary 0 followed by a binary 1, then seven data bits B1 through B7, a first synchronization bit S1 at binary 1 followed by seven data bits B8 through B14, a second synchronization bit S2 at binary 1 followed by seven data bits B15 through B21, and so on, terminating at an eighth synchronization bit S8 at binary 1 followed by seven data bits B57 through B63.

The first synchronization bit S1 is forced to binary 1 for the situation in which there is a sequence of eight consecutive binary zeros in the data bits B1 through B14. If this is not the case, this forcing to binary 1 is not necessary and the first synchronization bit S1 can therefore assume either value.

The value of this bit can therefore be binary 0. It is therefore necessary to look at data bits B1 through B14 to see if it includes at least one sequence of seven consecutive binary zeros.

If any such sequence is present synchronization bit S1 must be kept at binary 1; otherwise a control bit can be substituted for it.

Figure 2:
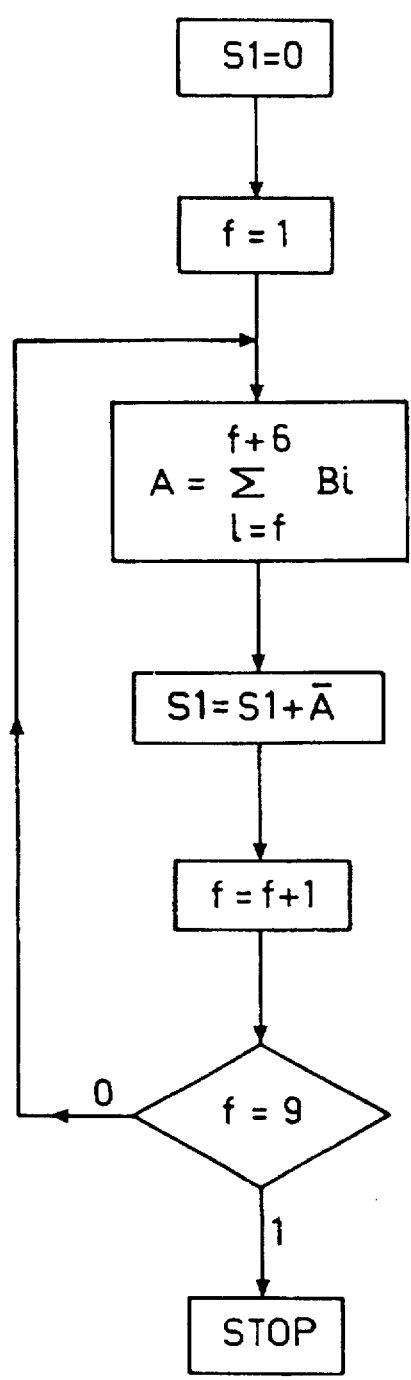
FIG. 2 is a diagrammatic representation of the processing of a synchronization bit.

Referring to FIG. 2, to carry out the substitution the first step is to initialize bit S1 to binary 0 and the index f of the first bit of the sequence to binary 1. The sum A of data bits B1 through B7 is calculated, complemented and the value binary 1 is assigned to bit S1 if $\overline{A}=1$.

This operation is the logical summing of S1 and $\overline{A}$.

If data bits B1 through B7 are all at binary 0 bit S1 must be kept at binary 1.

The index f is now incremented by one unit to consider data bits B2 through B8. The sum A of these data bits is calculated and bit S1 is forced to binary 1 if its complement $\overline{A}$ has the value binary 1.

This process is iterated, incrementing the index f, as far as considering data bits B8 through B14 to calculate the sum A and to force S1 to binary 1 if the complement $\overline{A}$ of this sum has the value binary 1. By convention, a response in the affirmative is shown by the digit binary 1 and in the negative by the digit binary 0 in FIG. 2 and the subsequent figures.

Following these operations, if bit S1 is at binary 1 it must be retained as a synchronization bit; otherwise a control bit can be substituted for it.

Figure 3:
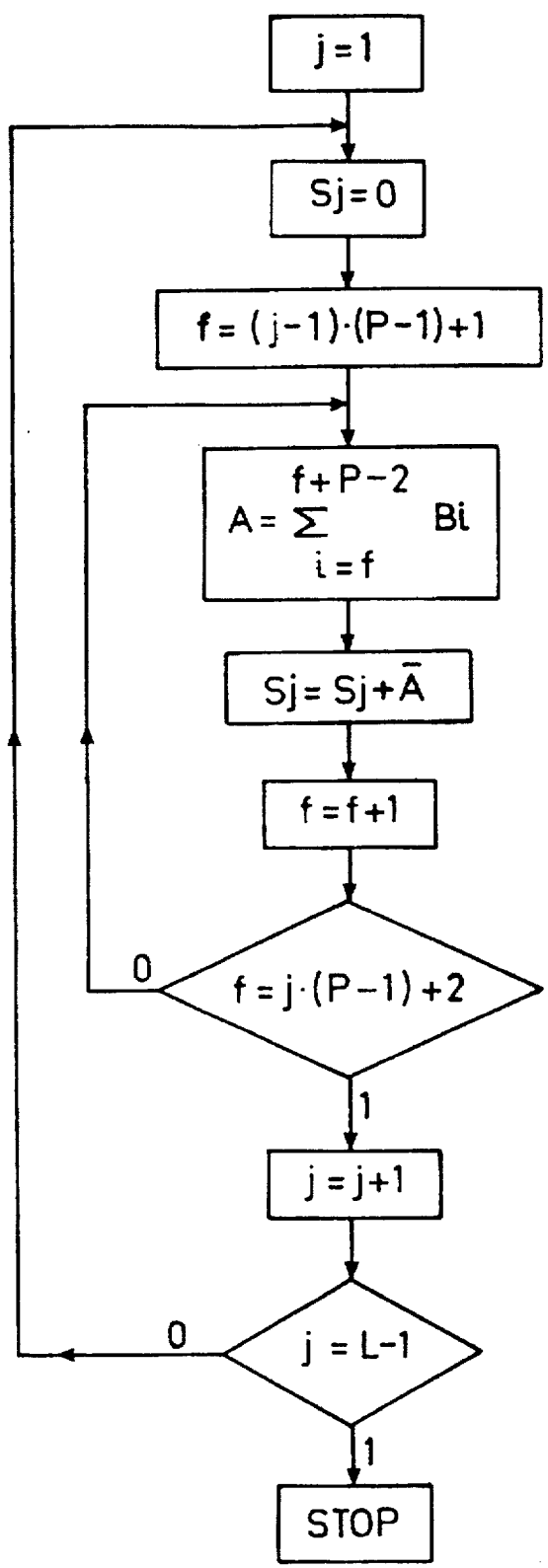
FIG. 3 is a diagrammatic representation of analysis processing relating to all synchronization bits.

It is a simple matter to generalize the processing of the first synchronization bit S1 to an analysis processing operation concerning all synchronization bits, as shown in FIG. 3. This even covers the case of a frame with P columns, i.e. in which the synchronization flag has a length P, and L rows.

Accordingly, processing begins by initializing the index j of the synchronization bit to binary 1.

In a first step, synchronization bit Sj is initialized to binary 0 and the index f of the first bit of the first sequence to be considered in relation to synchronization bit Sj is also initialized:

$$f=(j-1)\cdot(P-1)+1$$

In a second step the sum A of the data bits Bi is calculated with i varying from f through f+P−2. The value of synchronization bit Sj is forced to binary 1 if the complement $\overline{A}$ of this sum has the value binary 1 and the index f is incremented by one unit. If the index f is less than or equal to j·(P−1)+1 the second step is repeated, whereas if f is equal to j·(P−1)+2 the index j is incremented by one unit.

If the index j is less than L−1 the first step is repeated, followed by the second step P times, of course. On the other hand, if the index j is equal to L−1 the analysis processing is terminated and each synchronization bit Sj is at binary 1 or at binary 0 according to whether it is to be retained as a synchronization bit or can be substituted by a control bit, respectively.

Thus a transmitter (see FIG. 7) receives all the data bits B1 through BN where N has the value (P−1)·(L−1). It carries out the analysis processing described above using analysis means such as a microprocessor to produce synchronization bits S1 through SM where M has the value (L−2).

It is highly improbable that all the synchronization bits are at binary 1. The transmitter therefore has extra M control bits, even if they cannot all be transmitted.

In a first embodiment of the transmitter, the latter produces control bits C1 through CM itself so that bit Cj represents the parity of data bits B[(j−1)·(P−1)+1] through B[(j+1)·(P−1)]. It then performs the following logic operation for all values of j between 1 and M:

$$Sj=Sj+Cj$$

The transmitter then produces a frame to be sent to a receiver in the manner already described.

In a second embodiment of the transmitter not all control bits are deemed to be equally important and they are therefore classified in order of increasing importance. Thus if after the analysis processing only one synchronization bit is at binary 0, the latter is used to transmit the first control bit and the other control bits are not transmitted.

For example, the transmitter produces the control bits itself so that the first control bit C1 represents the parity of all the data bits B1 through BN. The second control bit C2 represents the parity of the first half of the data bits, the third control bit C3 represents the parity of the second half of the data bits, and so on.

The transmitter then carries out processing to distribute control bits to the available synchronization bits using distribution means such as the same microprocessor, for example.

Figure 4:
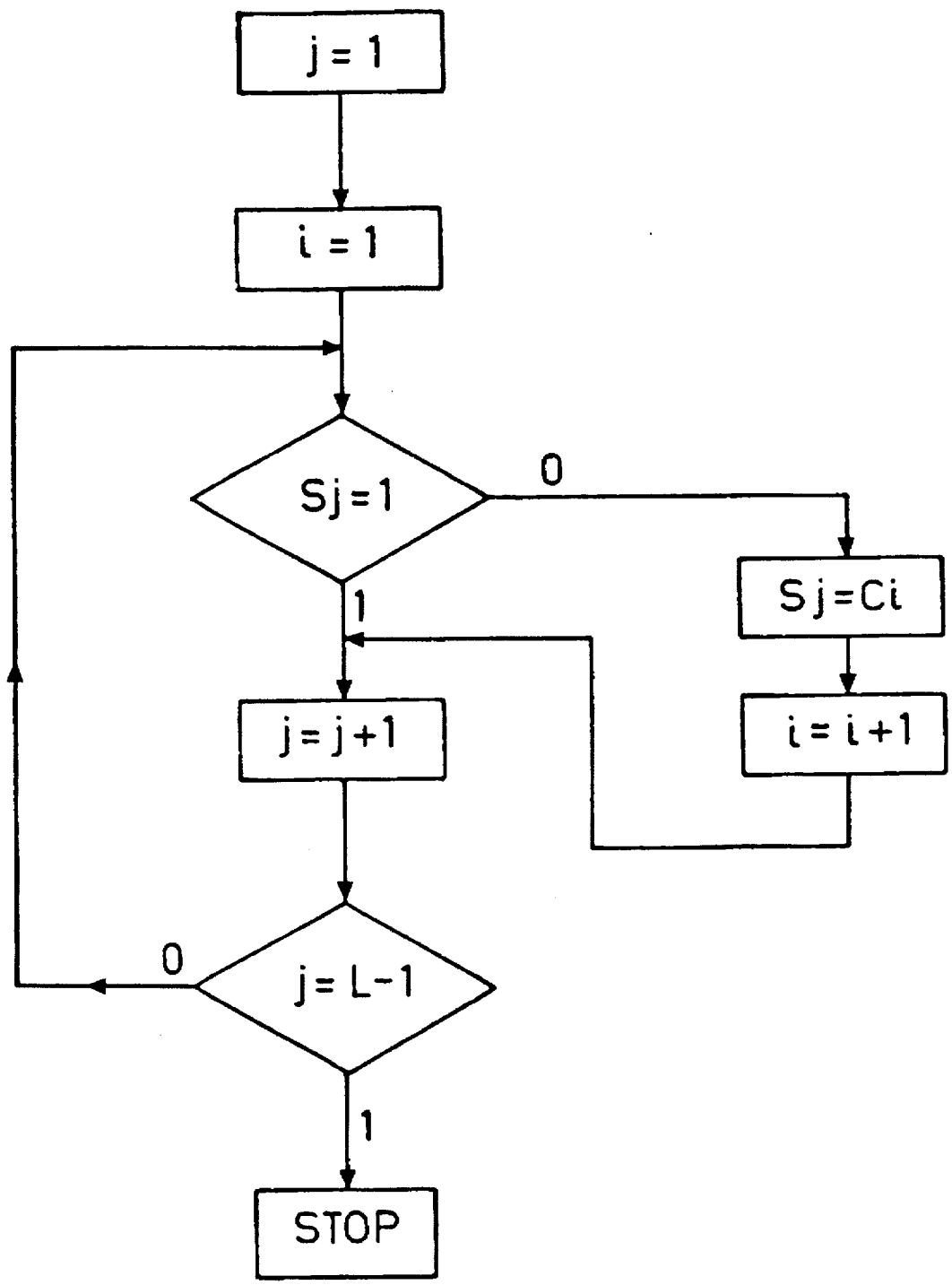
FIG. 4 is a diagrammatic representation of distribution processing of control bits effected by the second embodiment of the transmitter.

Referring to FIG. 4, this distribution processing begins by initializing to binary 1 the first and second indices j and i.

In an iterative step the value of the jth synchronization bit is compared to binary 1; if they are not equal Sj assumes the value of Ci and i is incremented by one unit. Moreover, whatever the value of Sj, j is incremented by one unit. The value of the first index j is then compared to L−1. If they are not equal the iterative step is repeated; otherwise the distribution processing is terminated.

The transmitter then produces a frame as previously described.

It is worth mentioning here that the invention naturally applies regardless of the nature of the control bits, even if they are generated externally of the transmitter.

It is assumed here that a receiver which receives the frames transmitted by the transmitter is synchronized, i.e. that it has detected the synchronization flag and can therefore identify the position of the various bits in the frame.

Also, the present invention is concerned only with processing of the synchronization bits. Accordingly, by convention, the jth bit Rj received is that corresponding to the jth synchronization bit Sj transmitted by the transmitter for all values of j between 1 and (L−2).

Figure 7:
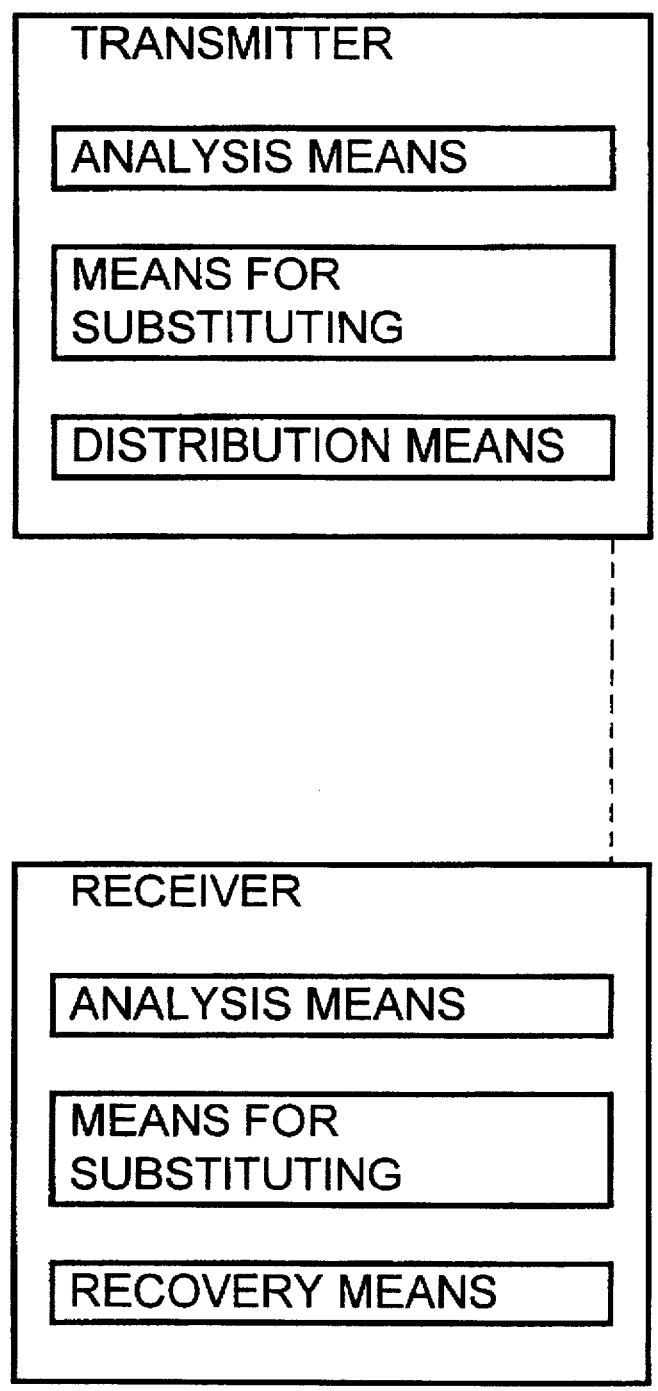
FIG. 7 shows a transmitter and a receiver according to an embodiment of the invention.

Referring to FIG. 7 the receiver which receives the frame therefore begins by carrying out analysis processing like the transmitter to determine the theoretical value of the synchronization bit Sj.

A first embodiment of the receiver operates in conjunction with the first embodiment of the transmitter.

The receiver then carries out recovery processing to identify the nature of the bits received, using recovery means such as a microprocessor.

Figure 5:
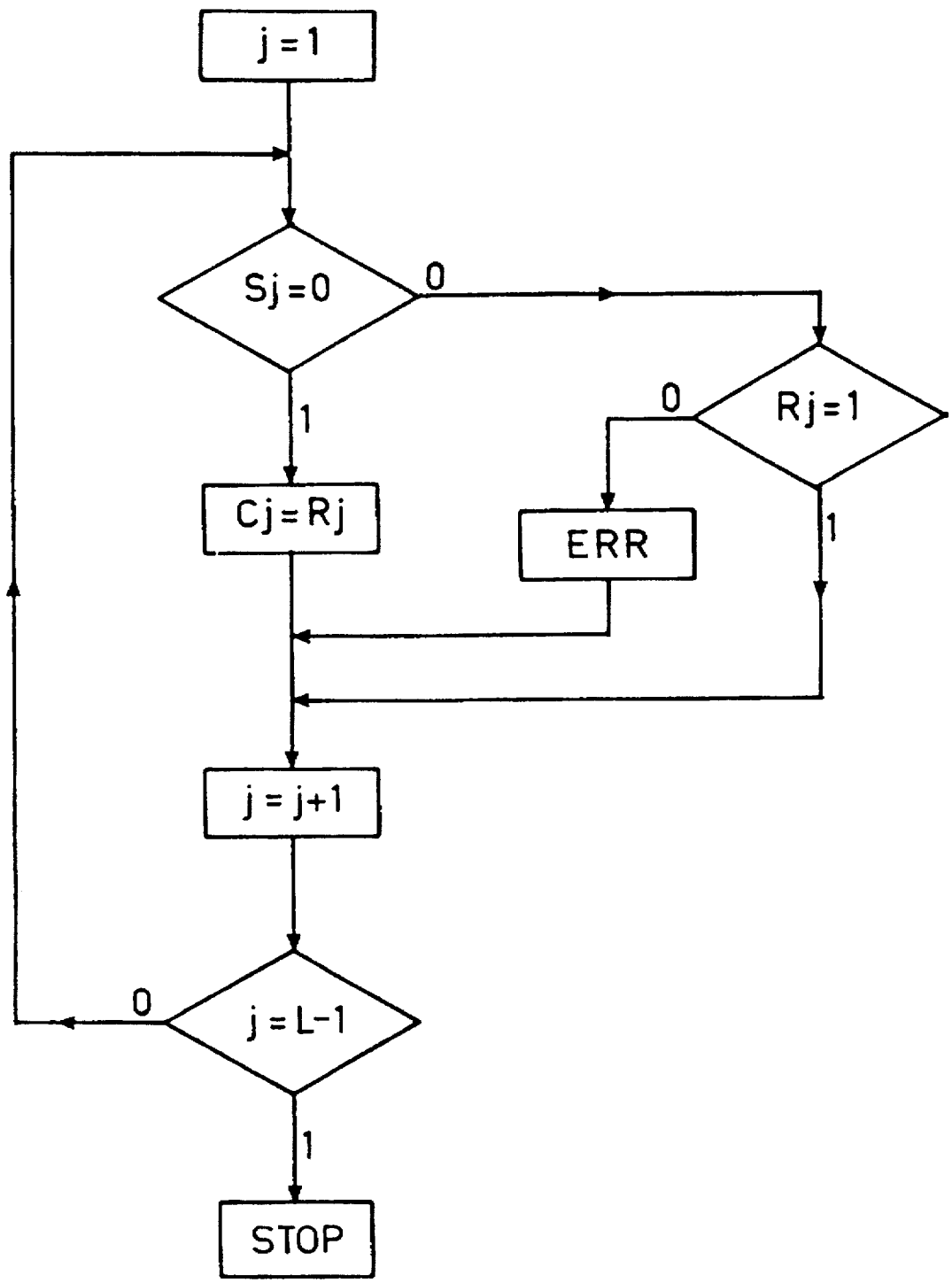
FIG. 5 is a diagrammatic representation of control bit recovery processing effected by the first embodiment of the receiver.

Referring to FIG. 5, the recovery processing begins by initializing the index j to binary 1. In an iterative step it compares the theoretical value of the jth synchronization bit Sj to binary 0. If they are not equal it produces an error signal if the jth bit received Rj is not at binary 1; if they are equal the value of the jth received bit Rj is assigned to the jth control bit Cj. The index j is then incremented by one unit and compared to (L−1). If they are not equal the iterative step is repeated; if they are equal the processing is terminated.

The receiver can then process the control bits actually transmitted. This aspect will not be considered further as it is not within the scope of the present invention.

A second embodiment of the receiver operates in conjunction with the second embodiment of the transmitter.

After the analysis processing the receiver carries out further recovery processing, using other recovery means such as a microprocessor.

Figure 6:
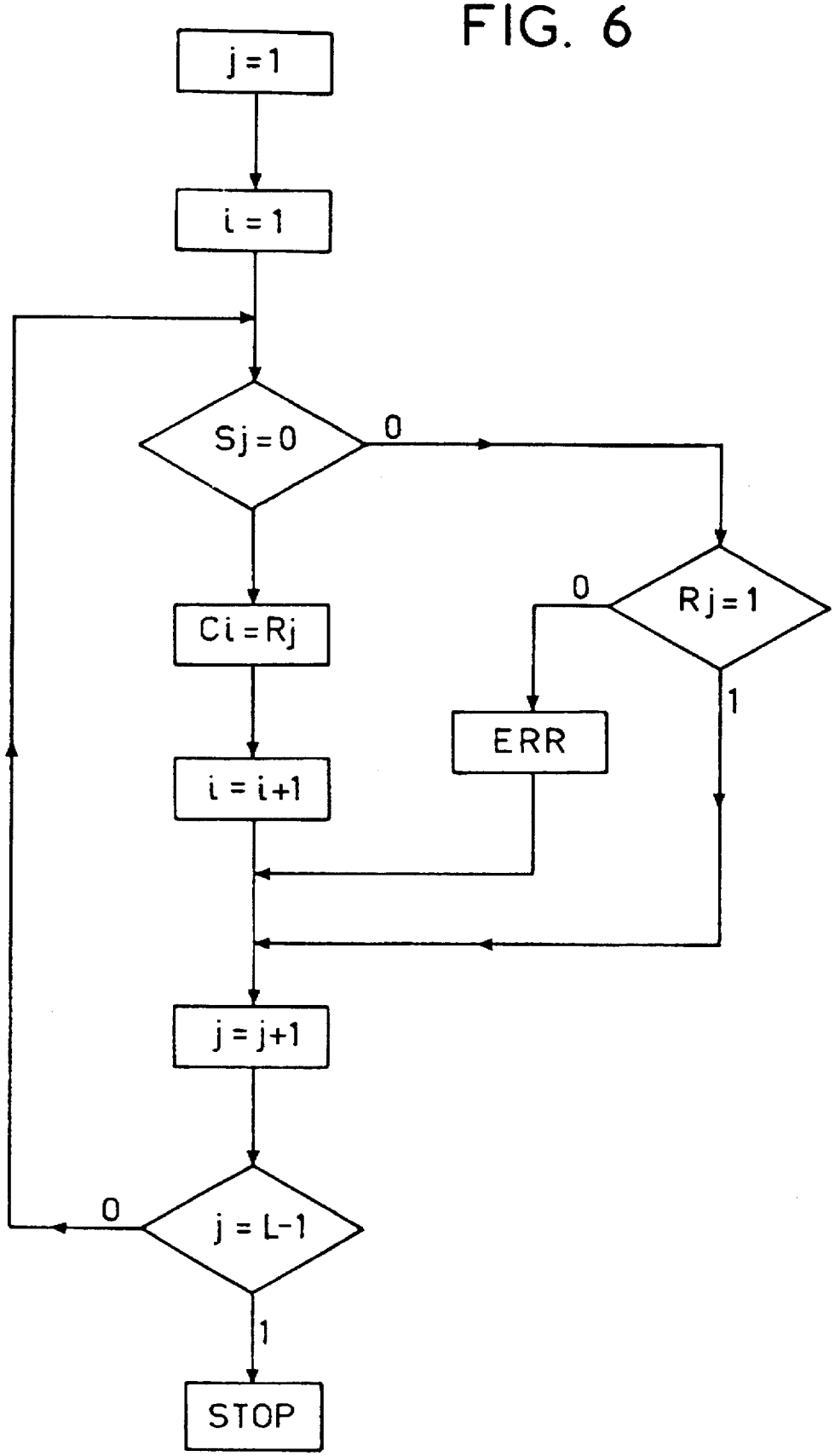
FIG. 6 is a diagrammatic representation of control bit recovery processing effected by the second embodiment of the receiver.

Referring to FIG. 6, this recovery processing starts by initializing first and second indices j and i to binary 1.

In an iterative step the theoretical value of the jth synchronization bit Sj is compared to binary 0. If they are not equal an error signal is produced if the jth bit received Rj is not at binary 1; if they are equal the value of the jth received bit Rj is assigned to the ith control bit Ci and the second index i is incremented by one unit. The first index j is then incremented by one unit and compared to (L−1).

If they are not equal the iterative step is repeated; if they are equal the processing is terminated.

In conclusion, the invention can optimize the efficiency of a frame by assigning control bits to synchronization bits which are not needed. An advantageous application of this facility is to use these control bits to secure transmission, and many other applications will suggest themselves to the person skilled in the art.

One problem with the V.110 frame type frame structures is that transmission can be affected by errors or disturbed in other ways.

The commonest errors concern a single bit or an erroneous bit stream, absence or duplication of a bit.

In all cases it is possible to receive an erroneous synchronization flag following inversion of one synchronization bit or a discontinuity in the frame format.

This is a serious problem if it is necessary to avoid waiting for a complete frame before validating the data block being received.

In such cases it is highly beneficial to replace the synchronization bits with labels which correspond to the order in which they occur in the frame: if the first label received is not that carrying the number 1 there is a synchronization error.

Unfortunately, this technique significantly reduces the usable data signaling rate. In the case of V.110 frames, for example, reserving one bit for this purpose in each data row reduces the data signaling rate by 1/7.

The first embodiment of the present invention can be used with advantage to solve this synchronization problem in most cases.

The synchronization bits Sj are replaced by control bits Cj whenever possible.

The control bits constitute a binary stream with good autocorrelation properties. For example, control bits C1 through C8 have the values '01100010'.

It is assumed here that the receiver has received the first and last synchronization flag bits at binary 0 and binary 1, respectively, and that it has identified the first and second bits received R1 and R2 which respectively correspond to the first and second control bits C1 and C2.

Considering these four bits in the order in which they are received, the following configurations can be present, in which an unknown bit is represented by a '?':

0101: synchronization is good because there is only one way that this sequence of bits can be received, 010?: there are two frame positions which correspond to this sequence of bits, 010?: synchronization is good, 01??: there are three frame positions which correspond to this sequence of bits.

Thus it is already possible to qualify the frame if bit R2 is received correctly.

By iteration of this principle, on reception of bit R3 it will be possible to reduce further the number of indeterminate cases and to decide either that the risk of error has become acceptable or that the data received cannot yet be regarded as valid.

This method is particularly beneficial when it is necessary to have received a certain number of data rows before processing thereof can begin: waiting for a sufficient number of bits Ri will usually be masked by the wait for the bits to be processed.

Coding specialists will have noted that the stream of bits Ci strongly influences the detection capacity of the method used and that this is a good choice if there is a Barker code corresponding to the frame length.

Generally speaking, determination of the optimal value of the stream of bits Ci as a function of the length of the frame and of the number of bits received for which the method is to be optimized is a problem which is easy to solve by an exhaustive study of all situations corresponding to these choices.

Finally, it is possible to assign the control bits a value which is a combination of a plurality of data bits, provided that the receiver has means to recover this data.

For example, a control bit can be the result of applying the "exclusive OR" logic operator to a parity bit and a code bit.

Also, the invention applies regardless of the number of control bits, including the situation in which there is only one control bit. In this latter case it can be sufficient to look for the first synchronization bit which is not needed and to substitute the single control bit for the latter. It is also feasible to place this control bit in more than one synchronization bit that is not needed to achieve redundancy which increases the probability of correct reception of this bit.

There is claimed:

1. A transmission frame, comprising:

a predetermined number of bits, there being defined rows and columns of said frame, each of said predetermined number of bits having a respective row and a respective column, said predetermined number of bits including a synchronization flag, synchronization bits, and data bits;

said synchronization flag comprising all of a first one of said rows, each bit of said first one of said rows having an identical first binary value, said synchronization flag further comprising a final synchronization flag bit which has a second binary value different from said first binary value, and which is in a first one of said columns and also in a second one of said rows;

said second one of said rows, except for said final synchronization flag bit comprising said data bits;

each row of a remainder of said rows including a third one of said rows, having defined therein a respective synchronization bit position and respective data bit positions;

for every one of said remainder rows, there being a respective set of bit positions defined which includes said respective data bit positions of a preceding row of said one of said remainder rows, includes said respective synchronization bit position of said one of said remainder rows, and includes said respective data bit positions of said each given row;

in only said remainder rows in which said respective set of bit positions, with said respective synchronization bit position assumed to have said first binary value, is free of any sequence of said bits identical to said bits of said first row, said synchronization bit positions include control bits1;

in said remainder rows in which said respective synchronization bit positions do not have said control bits, said respective synchronization bit positions have said synchronization bits with said second binary value.

2. Transmitter for transmitting a transmission frame comprising a synchronization flag, synchronization bits and data bits, comprising analysis means for identifying one of said synchronization bits at least such that any sequence of bits having a length equal to that of said synchronization flag including said synchronization bits differs from said synchronization flag by at least one bit in addition to said synchronization bit and means for substituting a control bit for the synchronization bits so identified.

3. Transmitter according to claim 2 wherein a control bit is associated with each of said synchronization bits and said transmitter transmits only control bits which correspond to said synchronization bits identified by said analysis means.

4. Transmitter according to claim 3 wherein said control bits are successive bits of a code which has good autocorrelation properties.

5. Transmitter according to claim 2 wherein said control bits are classified in priority order and further comprising distribution means for assigning said control bits according to their rank to synchronization bits identified by said analysis means in the order in which they are identified.

6. Receiver for receiving a transmission frame transmitted by a transmitter for transmitting a transmission frame comprising a synchronization flag, synchronization bits and data bits, comprising analysis means for identifying one of said synchronization bits at least such that any sequence of bits having a length equal to that of said synchronization flag including said synchronization bits differs from said synchronization flag by at least one bit in addition to said synchronization bit and means for substituting a control bit for the synchronization bits so identified, said receiver further comprising analysis means to determine the theoretical value of said synchronization bits and recovery means to identify at least that of said synchronization bits for which said control bit has been substituted.

* * * * *